United States Patent
Fujii

(10) Patent No.: US 11,210,041 B2
(45) Date of Patent: Dec. 28, 2021

(54) INFORMATION PROCESSING APPARATUS, INFORMATION PROCESSING SYSTEM, AND NON-TRANSITORY COMPUTER READABLE MEDIUM FOR EXTRACTING AND REPLICATING SETTING THAT NEEDS TO BE CHANGED

(71) Applicant: FUJIFILM BUSINESS INNOVATION CORP., Tokyo (JP)

(72) Inventor: Masaru Fujii, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 313 days.

(21) Appl. No.: 16/212,735

(22) Filed: Dec. 7, 2018

(65) Prior Publication Data
US 2019/0278537 A1    Sep. 12, 2019

(30) Foreign Application Priority Data

Mar. 6, 2018 (JP) ............................. JP2018-039418

(51) Int. Cl.
G06F 3/12 (2006.01)
(52) U.S. Cl.
CPC .......... *G06F 3/1231* (2013.01); *G06F 3/1204* (2013.01); *G06F 3/1288* (2013.01)
(58) Field of Classification Search
None
See application file for complete search history.

(56) References Cited

U.S. PATENT DOCUMENTS

| | | | | |
|---|---|---|---|---|
| 7,752,570 | B2* | 7/2010 | Minagawa | G06F 3/1284 715/810 |
| 8,699,044 | B2* | 4/2014 | Nakahara | G06F 3/1204 358/1.13 |
| 9,063,686 | B2* | 6/2015 | Suzuki | H04L 67/12 |
| 9,930,200 | B2* | 3/2018 | Kubota | H04N 1/0083 |
| 2006/0253617 | A1* | 11/2006 | Lin | G06F 9/4411 710/8 |
| 2007/0223024 | A1* | 9/2007 | Takesada | G06F 3/1204 358/1.13 |
| 2012/0268783 | A1 | 10/2012 | Nakahara | |

FOREIGN PATENT DOCUMENTS

| JP | 2015-153350 A | 8/2015 |
|---|---|---|
| JP | 2015-176480 A | 10/2015 |
| JP | 5939742 B2 | 6/2016 |

* cited by examiner

*Primary Examiner* — Paul F Payer
(74) *Attorney, Agent, or Firm* — Oliff PLC

(57) ABSTRACT

There is provided an information processing apparatus including: an extraction unit configured to, when an event for changing a configuration of the information processing apparatus occurs, extract a setting that needs to be changed; and a request unit configured to request another information processing apparatus that possesses the setting extracted by the extraction unit, to replicate the setting to the information processing apparatus.

12 Claims, 13 Drawing Sheets

FIG.6

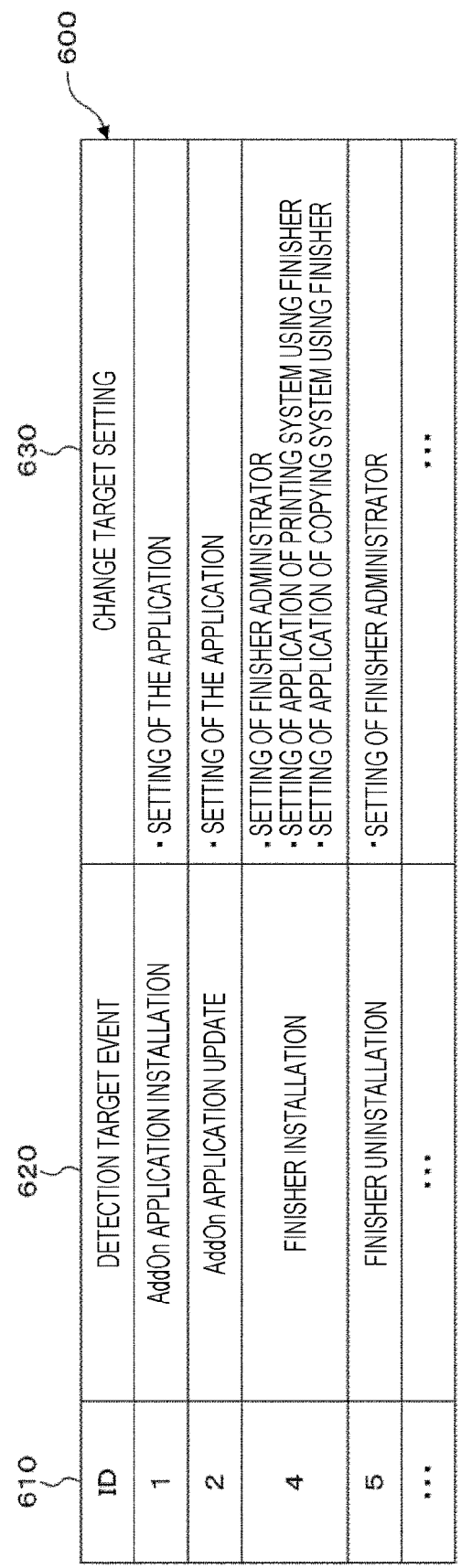

| ID | DETECTION TARGET EVENT | CHANGE TARGET SETTING |
|---|---|---|
| 1 | AddOn APPLICATION INSTALLATION | • SETTING OF THE APPLICATION |
| 2 | AddOn APPLICATION UPDATE | • SETTING OF THE APPLICATION |
| 4 | FINISHER INSTALLATION | • SETTING OF FINISHER ADMINISTRATOR<br>• SETTING OF APPLICATION OF PRINTING SYSTEM USING FINISHER<br>• SETTING OF APPLICATION OF COPYING SYSTEM USING FINISHER |
| 5 | FINISHER UNINSTALLATION | • SETTING OF FINISHER ADMINISTRATOR |
| ... | ... | ... |

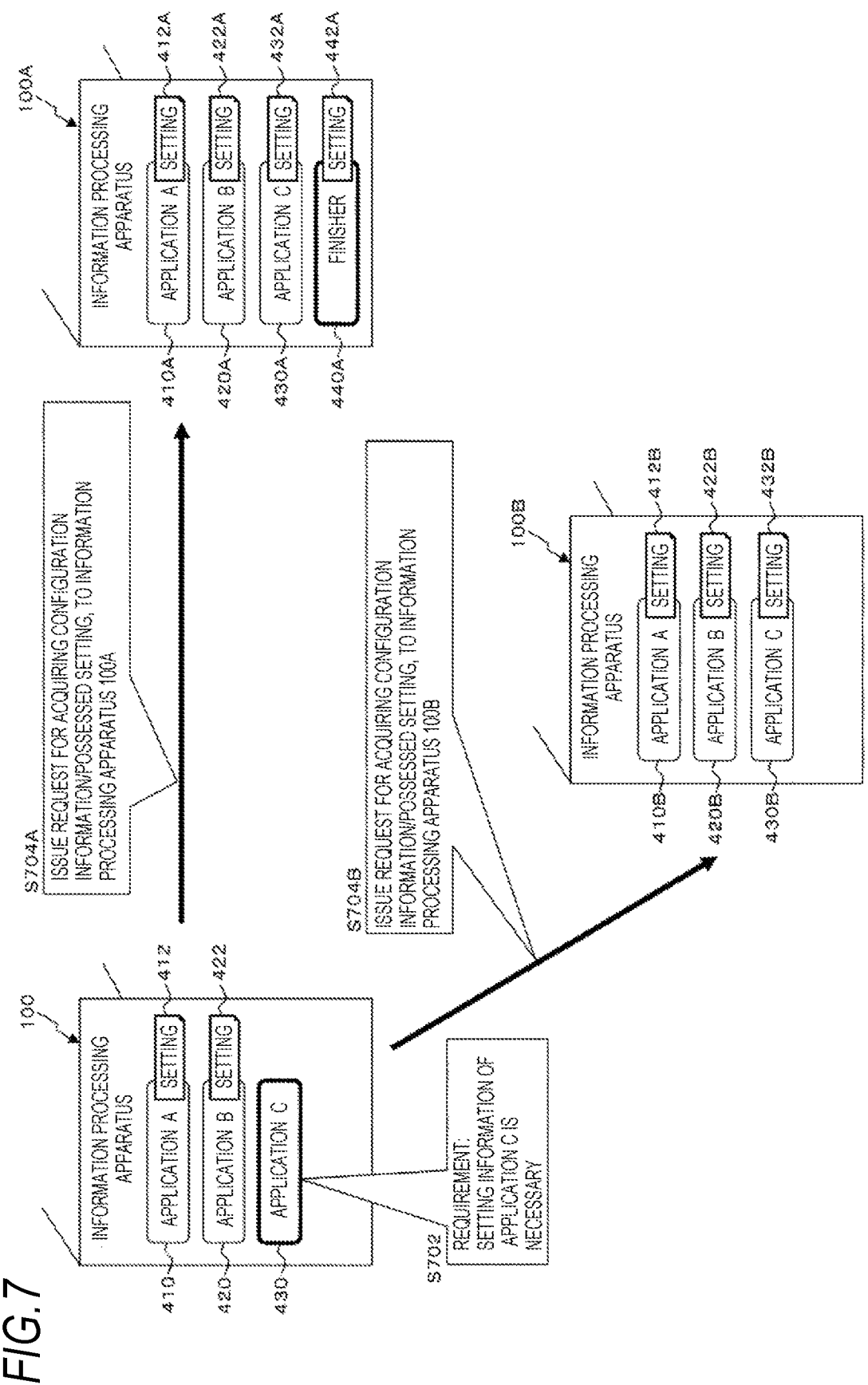

INFORMATION PROCESSING APPARATUS, INFORMATION PROCESSING SYSTEM, AND NON-TRANSITORY COMPUTER READABLE MEDIUM FOR EXTRACTING AND REPLICATING SETTING THAT NEEDS TO BE CHANGED

CROSS-REFERENCE TO RELATED APPLICATIONS

This application is based on and claims priority under 35 USC 119 from Japanese Patent Application No. 2018-039418 filed Mar. 6, 2018.

BACKGROUND

(i) Technical Field

The present invention relates to an information processing apparatus, an information processing system, and a non-transitory computer readable medium.

(ii) Related Art

JP-A-2015-153350 provides an image forming apparatus which can import setting information even on a function that has not been made effective in the own apparatus as long as the setting information is a setting item that does not affect the other setting items. In the image forming apparatus, a dependency relationship table storage unit stores data that defines the presence/absence of an influence of one setting item included in the setting information of the own apparatus on another setting item as the dependency relationship between the setting items, an importing level determination unit compares identification information of the own apparatus with identification information of another apparatus and, determines an importing level when reflecting the setting information of the another apparatus in the setting information of the own apparatus based on the comparison result, and a setting item reflection unit reflects the setting information of the another apparatus in the setting information of the own apparatus according to the determined importing level.

JP-A-2015-176480 discloses a technology that prevents important address information from being missed when an address book where the number of address information registrations is large is distributed into an address book of another device where the number of address information registrations is small. A first processing device exports an address book to a server device. The server device sets priorities for each type tag of address information registered in the address book, sequentially selects the address information set with the type tag in an order of the priorities, generates an address book where the address information is recorded in the order of the selection, and then, imports the generated address book into an address book of a second processing device. Thus, even when the number of the pieces of address information registered in the address book of the second processing device is smaller than that in the address book of the first processing device, the address information with a high priority is not missed from the address book of the second processing device.

JP-B-5939742 provides an image forming apparatus which controls multiple applications. The image forming apparatus includes: a saving unit that saves setting information input from a connected device in a temporary area; an acquisition unit that acquires device identification information including at least a machine type management number and a machine body management number from the setting information saved in the temporary area; a determination unit that determines different importing levels, from three importing levels, for the following respective cases: (1) a case where the machine type management number and the machine body management number that are included in the device identification information acquired by the acquisition unit match the machine type management number and the machine body management number of the own apparatus, (2) a case where the machine type management number included in the device identification information acquired by the acquisition unit matches the machine type management number of the own apparatus, and the machine body management number included in the device identification information does not match the machine body management number of the own apparatus, and (3) a case where the machine type management number included in the device identification information acquired by the acquisition unit do not match the machine type management number of the own apparatus, as the result of the comparison between the device identification information acquired by the acquisition unit and the machine type management number and the machine body management number of the own apparatus; an extraction unit that extracts one or more setting values to be reflected in the own apparatus from the setting information according to the determined importing levels and attributes corresponding to multiple setting values, respectively, included in the setting information saved in the temporary area; and a storage unit that stores the one or more setting values extracted by the extraction unit in a storage to be used for a control in each application. As for the attributes corresponding to the setting values, the following four attributes exist: (a) an object not to be imported; (b) importing is possible only when the machine type management number and the machine body management number that are included in the device identification information acquired by the acquisition unit match the machine type management number and the machine body management number of the own apparatus; (c) importing is also possible when the machine type management number included in the device identification information acquired by the acquisition unit matches the machine type management number of the own apparatus, and the machine body management information included in the device identification information does not match the machine body management number of the own apparatus; and (d) importing is also possible when the machine type management number included in the device identification information acquired by the acquisition unit does not match the machine type management number of the own apparatus. The extraction unit extracts a setting value corresponding to an attribute indicating an importable setting value in the importing levels determined by the determination unit.

SUMMARY

For example, where a setting of an application may be performed on a specific information processing apparatus, and a similar setting of the application may be desired to be performed on another information processing apparatus as well. In order to reduce the effort of performing the setting again on the other information processing apparatus, a setting synchronization technique by a replication process (also called cloning) has been used in the related art.

It should be noted that setting items are different according to a configuration of, for example, a hardware option of an information processing apparatus. Hence, the replication process has been performed so that the replicated settings include even a setting item that is not currently being used. As a result, an extra storage area for the setting item that is not being used is required.

Aspects of non-limiting embodiments of the present disclosure relate to providing an information processing apparatus, an information processing system, and a non-transitory computer readable medium in which when a configuration of the information processing apparatus is changed, an extra storage area is prevented from being consumed, and a replication of a setting can be requested to another information processing apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: an extraction unit configured to, when an event for changing a configuration of the information processing apparatus occurs, extract a setting that needs to be changed; and a request unit configured to request another information processing apparatus that possesses the setting extracted by the extraction unit, to replicate the setting to the information processing apparatus.

BRIEF DESCRIPTION OF THE DRAWINGS

Exemplary embodiment(s) of the present invention will be described in detail based on the following figures, wherein:

FIG. 6 is an explanatory view illustrating an example of a data structure of a detection target event/change target setting table;

FIG. 7 is an explanatory view illustrating an example of the process according to the exemplary embodiment;

DETAILED DESCRIPTION

Hereinafter, exemplary embodiments for implementing the present invention will be described based on the accompanying drawings.

Figure 1:
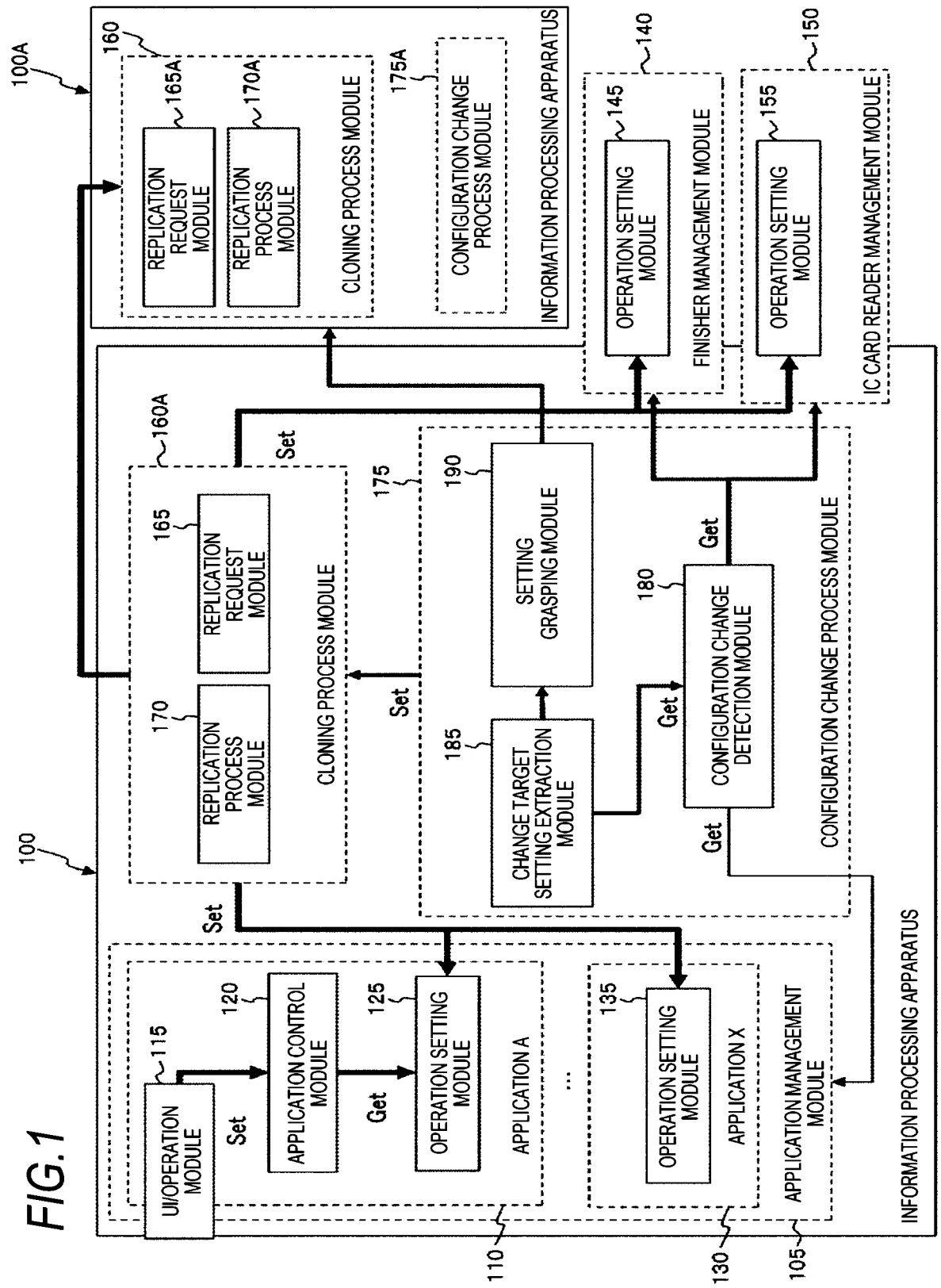
FIG. 1 is a conceptual module configuration diagram illustrating an example of a configuration of an exemplary embodiment.

FIG. 1 illustrates a conceptual module configuration diagram relating to an example of a configuration of the present exemplary embodiment.

In general, a module refers to a logically separable component of, for example, software (computer program) or hardware. Accordingly, a module in the present exemplary embodiment indicates not only a module in a computer program but also a module in a hardware configuration. Thus, the descriptions of the present exemplary embodiment also include descriptions of a computer program for causing a computer to function as a module (a program for causing a computer to execute each procedure, a program for causing a computer to function as each unit, or a program for causing a computer to implement each function), a system, and a method. For the convenience of descriptions, the expressions "store", "caused to store", and equivalent expressions thereto will be used, and when the present exemplary embodiment is a computer program, the expressions indicate storing data or the like in a storage device or performing a control to store data or the like in a storage device. In addition, one module may correspond to one function. In implementation, however, one module may be configured with one program, multiple modules may be configured with one program, or in reverse, one module may be configured with multiple programs. Further, multiple modules may be executed by one computer, or one module may be executed by multiple computers in a distributed or parallel environment. In addition, one module may include another module. In addition, hereinafter, the term "connection" is used in a case of a logical connection as well (e.g., data exchange, instructions, a reference relationship among data, and login), in addition to a physical connection. The term "predetermined" refers to being determined prior to a target process, and includes the meaning of being determined according to a circumstance/state at or until a specific time point not only before a process by the present exemplary embodiment is started, but also prior to the target process even after the process by the present exemplary embodiment is started. When multiple "predetermined values" exist, the values may be different from each other, or two or more of the values (including any values) may be identical to each other. In addition, the description "when it is A, B is performed" indicates that "it is determined whether it is A or not, and when it is determined that it is A, B is performed", except for a case where the determination of whether it is A or not is unnecessary. In addition, when items are enumerated like "A, B, and C", the enumeration is merely exemplary and includes a case of selecting only one (e.g., only A) of the items, unless otherwise specified.

In addition, a system or device includes a configuration implemented with, for example, one computer, hardware component, or device as well, in addition to a configuration in which, for example, multiple computers, hardware components, or devices are connected to each other by a communication unit such as a network (including a one-to-one corresponding communication connection). The terms "apparatus", "device", and "system" are used to have the same meaning. The "system" does not include a system merely meaning a social "structure" (social system) which is an artificial engagement.

In addition, target information is read from a memory device per process which is performed by each module or for each process in a case where multiple processes are performed in a module. After the process is executed, the process result is written in the storage device. Thus, descriptions regarding the reading from the storage device prior to the process and the writing in the storage device after the process may be omitted. In addition, examples of the storage device may include a hard disk, a random access memory (RAM), an external storage medium, a storage device through a communication line, and a register within a central processing unit (CPU).

An information processing apparatus 100 (also referred to as a "device") of the present exemplary embodiment is one that requests another information processing apparatus 100 to replicate a setting. The information processing apparatus 100 includes an application management module 105, a finisher management module 140, an IC card reader management module 150, a cloning process module 160, and a configuration change process module 175 as illustrated in the example of FIG. 1.

The information processing apparatus 100 executes a cloning starting from an event for changing a configuration. The cloning (hereinafter, also referred to as "replication") refers to replicating data (including, for example, an application program and setting information) from another information processing apparatus 100, or replicating data of the own information processing apparatus 100 to another information processing apparatus 100.

In addition, the information processing apparatus 100 may be any apparatus as long as it is a cloning target. For example, examples of the information processing apparatus 100 include a personal computer, a mobile terminal device, and an image processing apparatus. An image processing apparatus will be used in the example described hereinbelow.

In the present exemplary embodiment, for example, the following process is performed. The descriptions below (descriptions in this paragraph) are particularly intended to facilitate the understanding of the present exemplary embodiment, but are not intended to interpret the present exemplary embodiment in a limited manner with reference to the descriptions. Further, a determination as to whether the invention sought to be patented is described in the detailed description of the invention should not be made only based on this description portion.

When a setting of an application is performed on a specific device and it is desired to use the setting of the application on another device, a setting synchronization technique by a cloning (replication process) has been used in the related art in order to reduce an operator's effort for performing the setting again (performing a setting on a first device and performing a setting on a second device).

The cloning technique is generally performed as follows: (1) setting information of an own device is stored (overwritten) as it is in another device based on an instruction from a user or a system; or (2) the user backs up data such as a setting in, for example, a central processor once at an arbitrary timing, and then, restores the backed-up data in another arbitrary device at an arbitrary timing.

However, when the devices are different from each other in a configuration of, for example, a hardware option, the application or setting thereof cannot be the cloning target. Further, even though the cloning has been performed, a cloning occurs again after the configuration of, for example, the hardware option conforms to each other in the devices.

For a setting which is to be required in future after a configuration of a device is changed, the technique disclosed in JP-A-2015-153350 includes a unit that clones settings including a setting group that is not currently being used.

This unit eliminates for an operator to perform the cloning operation again.

However, it is not preferable that the unit is applied to the following cases, and thus, the unit is problematic in view of a practical use. That is, since the unit depends on the future prediction that is performed before the configuration is changed, an influence by a sudden change of a configuration in the future that is not predicted may not be exactly predicted and absorbed.

(Case 1)

Until the configuration is changed, a storage area for the setting is excessively consumed. For example, in order to prepare for a case where an external device is connected, various settings of the external device are saved in a setting area or a preliminary storage area. However, the settings are not used (but wasted) before the external device is connected, and this saving is not beneficial in view of resource utilization.

(Case 2)

Until the configuration is changed, the act of performing a setting itself may not be permitted. For example, a safety device operates until the external device is connected, and thus, a setting itself cannot be performed. Or, a setting destination object has not yet been in a usable state (so-called undeployed state).

(Case 3)

Additionally, the unit has a problem in practical use with regard to the version of the hardware option up to which setting information is cloned. For example, cloning data that includes data of an old version (e.g., Ver1) may be invalid in a case where an external device of a new version (e.g., Ver3) is connected. That is, the obsolescence of a forward compatibility relationship occurs in the setting information of the target hardware option.

Thus, the information processing apparatus 100 detects that a configuration in a device is changed, and by using the change of the configuration as a trigger, the information processing apparatus 100 determines a device which becomes a cloning source, based on configurations of other devices (generally, plural devices) capable of communicating with the present device and settings possessed by the other devices, and performs a cloning in an event driven manner. That is, the information processing apparatus 100 performs the cloning based on a situation where a setting update occurs, rather than the unit depending on the future prediction. As a result, it is possible to cope with the three cases described above, and it is possible to implement a cloning that flexibly responds to the sudden change of a configuration.

The changeable configurations in the information processing apparatus 100 are, for example, an application in the application management module 105, and external devices (hardware options) such as the finisher management module 140 and the IC card reader management module 150. Accordingly, the configuration change detection module 180 may detect an event for changing a configuration in the following cases: where an application A 110 in the application management module 105 is, for example, set up (installed) or upgraded; where, for example, the finisher management module 140 is newly installed (the information processing apparatus 100 and the finisher management module 140 are connected to each other); and where the finisher management module 140 is replaced.

The application management module 105 includes the application A 110 and an application X 130. The application management module 105 is connected to the configuration change detection module 180 of the configuration change process module 175. FIG. 1 illustrates a state where the application A 110 and the application X 130 have been installed (or a state where the applications are installed from now on).

The application A 110 includes a UI/operation module 115, an application control module 120, and an operation setting module 125. For example, when the information processing apparatus 100 is an image processing apparatus, the application A 110 corresponds to add-on software for a printing process.

The UI/operation module 115 is connected to the application control module 120. The UI/operation module 115 has a function of a user interface. The UI/operation module 115 controls, for example, a liquid crystal display serving as a touch panel to receive an operation by the user and present, for example, a message to the user. In addition, the UI/operation module 115 may receive the user's operation (including, for example, gaze, gesture, and voice) using, for example, a mouse, a keyboard, a camera, and a microphone, and may present a message to the user by a voice output from a speaker or a touch sense using a touching device.

The application control module 120 is connected to the UI/operation module 115 and the operation setting module 125. The application control module 120 controls a process of an application itself. At that time, the application control module 120 performs the process of the application by acquiring (getting) the setting in the present information processing apparatus 100 from the operation setting module 125.

The operation setting module 125 is connected to the application control module 120 and the cloning process module 160. The operation setting module 125 sets and manages the setting information acquired by the cloning process module 160. In the present information processing apparatus 100, the setting information corresponds to, for example, setting a duplex printing as a default (initial setting).

The application X 130 includes an operation setting module 135. When the information processing apparatus 100 is an image processing apparatus, the application X 130 corresponds to, for example, add-on software for a scanning process.

The operation setting module 135 is connected to the cloning process module 160. The operation setting module 135 sets and manages the setting information acquired by the cloning process module 160. In the present information processing apparatus 100, the setting information corresponds to, for example, setting a reading of black-and-white data (binary data) as a default (initial setting).

The finisher management module 140 includes an operation setting module 145 and is connected to the configuration change detection module 180 of the configuration change process module 175. FIG. 1 illustrates a state where the finisher management module 140 is provided in the information processing apparatus 100 (or a state where the finisher management module 140 is connected to the information processing apparatus 100 from now on).

The operation setting module 145 is connected to the cloning process module 160. The operation setting module 145 sets the setting information (operation setting) acquired by the cloning process module 160. The operation setting module 145 manages an operation setting in a finisher having functions of, for example, hole punching and a stapler. The operation setting corresponds to, for example, an operation setting in which punching of two holes is set as a default.

The IC card reader management module 150 includes an operation setting module 155 and is connected to the configuration change detection module 180 of the configuration change process module 175. FIG. 1 illustrates a state where the IC card reader management module 150 is provided in the information processing apparatus 100 (or a state where the IC card reader management module 150 is connected to the information processing apparatus 100 from now on).

The operation setting module 155 is connected to the cloning process module 160. The operation setting module 155 sets the setting information (operation setting) acquired by the cloning process module 160. The operation setting module 155 manages an operation setting in an IC card reader. The operation setting corresponds to, for example, an operation setting in which a predetermined communication protocol (block transmission protocol) is set as a default.

The cloning process module 160 includes a replication request module 165 and a replication process module 170. The cloning process module 160 is connected to the operation setting module 125 of the application A 110, the operation setting module 135 of the application X 130, the operation setting module 145 of the finisher management module 140, the operation setting module 155 of the IC card reader management module 150, the configuration change process module 175, and a cloning process module 160A of an information processing apparatus 100A. The cloning process module 160 sets a setting received in response to a request by the replication request module 165, in a module requiring the setting (for example, the application in the application management module 105, the cloning process module 160, or the IC card reader management module 150).

The replication request module 165 requests another information processing apparatus 100 that possesses a setting extracted by a change target setting extraction module 185 (an information processing apparatus 100 selected as a target by a setting grasping module 190), to replicate the setting to the present information processing apparatus 100 (requests the other information processing apparatus 100 to transmit the setting).

In addition, when there are a plurality of other information processing apparatuses 100 that possess the setting extracted by the change target setting extraction module 185, the replication request module 165 may select an information processing apparatus 100 to which the request is to be made, based on the configurations of the present information processing apparatus 100 and the other information processing apparatuses 100. Here, examples of the description "based on the configurations of the present information processing apparatus 100 and the other information processing apparatus 100" include a case where there is no difference in configuration between the present information processing apparatus 100 and another information processing apparatus 100, a case where there is the smallest difference in configuration between the present information processing apparatus 100 and another information processing apparatus 100, and a case where there is most similarity in configuration between the present information processing apparatus 100 and another information processing apparatus 100. Here, the configurations to be compared may be predetermined configuration items.

In addition, when another information processing apparatus 100 that possesses the same settings as the plurality of settings extracted by the change target setting extraction module 185 does not exist, the replication request module 165 may select a plurality of other information processing apparatuses 100 each of which possess at least any of the plurality of extracted settings. Here, examples of "another information processing apparatus 100 that possesses the same settings as the plurality of settings" include another information processing apparatus 100 that possesses all of the plurality of settings.

In addition, in a case where another information processing apparatus 100 has been subjected to the replication, the replication request module 165 may not make the replication request to the other information processing apparatus 100. Here, the case "where another information processing apparatus 100 has been subjected to the replication" corresponds to a case where another information processing apparatus 100B has been subjected to a replication process (has been replicated) by another information processing apparatus 100C (an information processing apparatus 100 which is neither the present information processing apparatus 100 nor the information processing apparatus 100B). That is, the other information processing apparatus 100B has requested a replication to the other information processing apparatus 100C. This is intended to secure the safety and stability of the replication process because when the replication to the information processing apparatus 100B is performed, the setting itself of the information processing apparatus 100B is changed.

In addition, a timing of detecting the "case where another information processing apparatus 100 has been subjected to the replication" may be, for example, a timing at which the configuration of the other information processing apparatus 100 is confirmed. In that case, a situation where "the other information processing apparatus 100 has been subjected to the replication" at that time corresponds to the "case where another information processing apparatus 100 has been subjected to the replication".

In addition, examples of the description "not making a replication request" include transmitting no replication request and prohibiting the replication request.

In addition, when the replication request module 165 cannot make the request, the replication request module 165 may make a notification to a user in order to prompt an existing replication process or a manual replication process. Here, examples of the "case where the replication request module 165 cannot make the request" may include a case where another information processing apparatus 100 that possesses the target setting does not exist.

In addition, when there exists a setting that is inappropriate for the replication, the replication request module 165 may notify the user of the setting. Here, examples of the "setting that is inappropriate for the replication" corresponds to include a setting of a confidential box and a setting of an output of a full-color machine when the information processing apparatus 100 to be replicated is a full-color machine, despite that the information processing apparatus 100 requesting the replication is a black-and-white machine.

Upon receiving the replication request from the replication request module 165 (replication request module 165A) of another information processing apparatus 100 (information processing apparatus 100A), the replication process module 170 replicates the setting to the other information processing apparatus 100 (information processing apparatus 100A) according to the request. Specifically, the replication process module 170 extracts the setting in the own information processing apparatus 100, and transmits the setting to the other information processing apparatus 100 (information processing apparatus 100A) that has made the request.

Here, "another information processing apparatus 100" is the information processing apparatus 100A which is a replication request source. Accordingly, the information processing apparatus 100 that has received the request replicates the specified setting to the information processing apparatus 100A which is the replication request source. In addition, examples of "another information processing apparatus 100" also include an "apparatus that manages the replication process on a cloud system". Especially, when the process is performed on the cloud system (that is, when the process is performed by an apparatus on the cloud system), a process of, for example, crossing the firewall is necessary.

In addition, when each information processing apparatus 100 includes the replication request module 165 and the replication process module 170, the information processing apparatuses 100 are capable of performing the replication process in an asynchronous manner.

The configuration change process module 175 includes a configuration change detection module 180, a change target setting extraction module 185, and the setting grasping module 190. The configuration change process module 175 is connected to the cloning process module 160.

The configuration change detection module 180 is connected to the application management module 105, the finisher management module 140, the IC card reader management module 150, and the change target setting extraction module 185. The configuration change detection module 180 detects an occurrence of an event for changing the configuration of the present information processing apparatus 100. Here, the case of an "occurrence of an event" indicates standing by for the event and performing a process according to the occurring event (or detected event). The case indicates a so-called event-driven method.

The event to be detected includes installation or uninstallation of a hardware option or an extension unit of the present information processing apparatus 100, a setup or a change of firmware or an application, a change of a setting on an authority of an administrator, or a change of a setting for each user. Here, the "setup or change of firmware or an application" includes a change of a version of the firmware or application (including an update and a downgrade).

The change target setting extraction module 185 is connected to the configuration change detection module 180 and the setting grasping module 190. When the configuration change detection module 180 detects an occurrence of an event for changing the configuration of the present information processing apparatus 100, the change target setting extraction module 185 extracts a setting that needs to be changed from a current state. Here, the "setting that needs to be changed when an event is detected" may include an operation setting of the installed or uninstalled hardware option or extension unit, an operation setting of the set-up or changed firmware or application, the change of the setting on the authority of the administrator, or the change of the setting for each user. In addition, the "setting that needs to be changed" may include a setting that needs to be changed in relation to the setting that is changed. Here, the "setting that needs to be changed in relation to the setting that is changed" refers to other settings that need to be changed one after another. For example, if a setting performed by the administrator prohibits copying on an image processing apparatus, the copying is also prohibited in a copy application which is add-on software.

The setting grasping module 190 is connected to the change target setting extraction module 185 and the information processing apparatus 100A. The setting grasping module 190 communicates with another information processing apparatuses 100 (for example, the information processing apparatus 100A) to acquire, for example, the configuration of the other information processing apparatus 100 and a setting that the other information processing apparatus 100 possesses. Then, the setting grasping module 190 selects another information processing apparatus 100 that possesses the setting extracted by the change target setting extraction module 185, as a target to which a replication request is to be made.

The information processing apparatus 100A is the other information processing apparatus 100. The information processing apparatus 100A includes the cloning process module 160A and a configuration change process module 175A as in the information processing apparatus 100. The information processing apparatus 100A is connected to the setting grasping module 190 of the configuration change process module 175 in the information processing apparatus 100.

The cloning process module 160A includes the replication request module 165A and a replication process module 170A. The cloning process module 160A is connected to the cloning process module 160 of the information processing apparatus 100.

The modules in the information processing apparatus 100A are equivalent to those in the information processing apparatus 100. In addition, the information processing apparatus 100A may include, for example, the application management module 105, the finisher management module 140, and the IC card reader management module 150, and/or may include other applications and other hardware options.

The information processing apparatus 100 that requests the replication may not include the replication process module 170. This is because the replication process module 170 is a module that receives the replication request. Meanwhile, the information processing apparatus 100 that receives the replication request (for example, the information processing apparatus 100A) may not include neither the replication request module 165 nor the configuration change process module 175. This is because the replication request module 165 and the configuration change process module 175 are modules that make the replication request. It is noted that any information processing apparatus 100 may not only make the replication request but also receive the replication request and perform the replication process. Thus, one information processing apparatus 100 may include the replication request module 165, the replication process module 170, and the configuration change process module 175.

Figure 2:
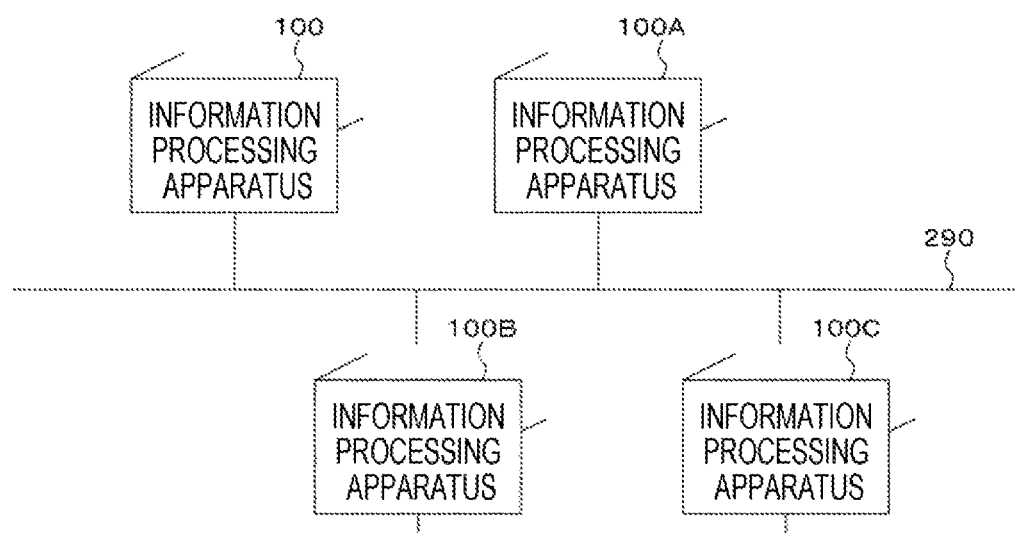
FIG. 2 is an explanatory view illustrating an example of a system configuration using the exemplary embodiment.

FIG. 2 is an explanatory view illustrating an example of a system configuration using the present exemplary embodiment.

The information processing apparatus 100, the information processing apparatus 100A, the information processing apparatus 100B, and the information processing apparatus 100C are connected to each other via a communication line 290. The communication line 290 may be a wireless communication line, a wired communication line, or a combination thereof. Also, the communication line 290 may be, for example, the Internet or the Intranet as a communication infrastructure. With respect to two or more information processing apparatuses 100 that are able to communicate with each other, each information processing apparatus 100 requires interfaces (the cloning process module 160 and the configuration change process module 175) for replicating the setting of the own information processing apparatus 100 to a counterpart information processing apparatus 100.

For example, when a new application is installed in the information processing apparatus 100, an operation setting necessary for the application is acquired from the information processing apparatus 100A that possesses the configuration equivalent to that of the information processing apparatus 100, and the operation setting is set in the application. Then, the information processing apparatus 100 may be used with the same operation setting as that of the information processing apparatus 100A.

Figure 3:
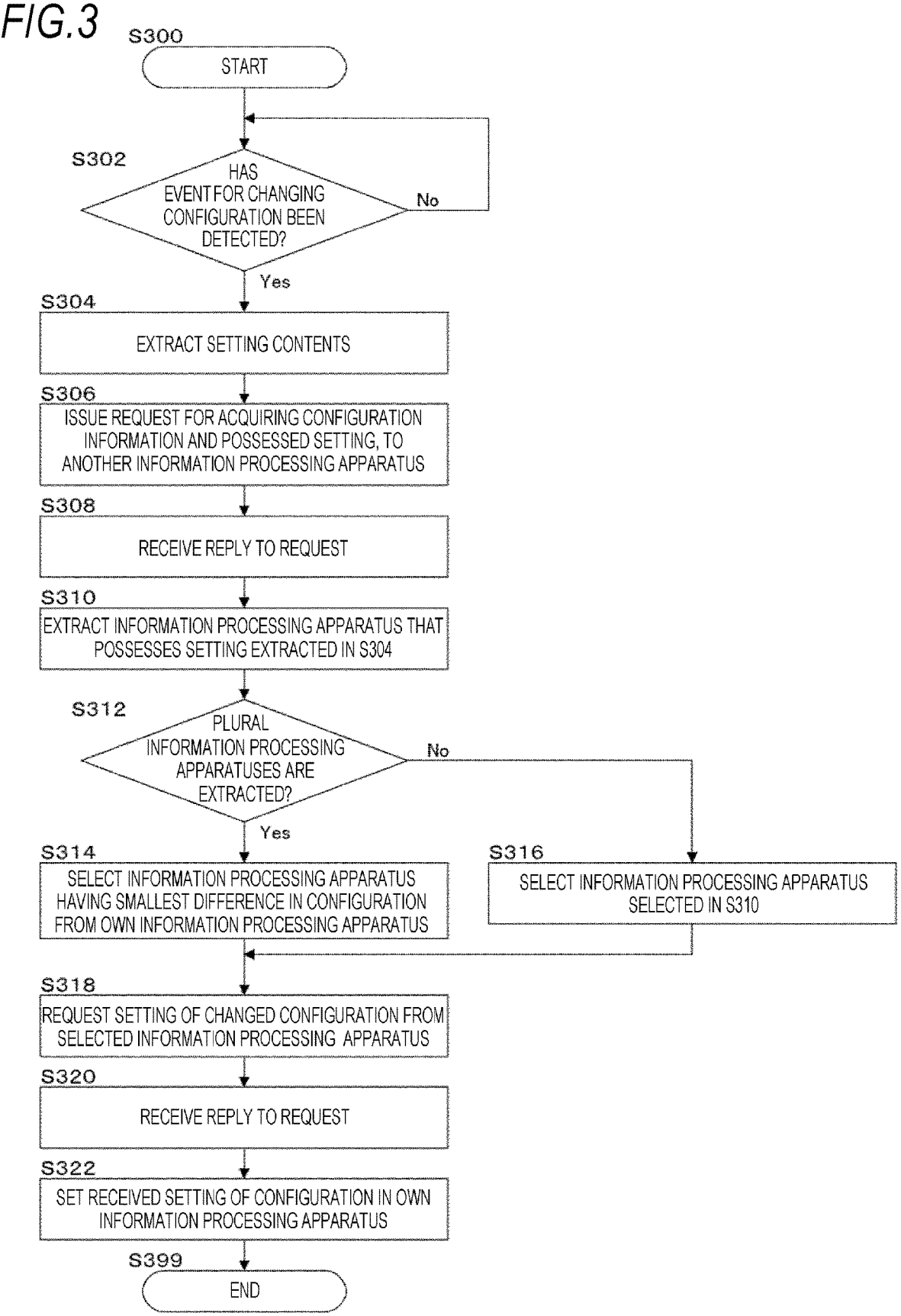
FIG. 3 is a flowchart illustrating an example of a process according to the exemplary embodiment.

FIG. 3 is a flowchart illustrating an example of a process according to the present exemplary embodiment.

In step S302, the configuration change detection module 180 determines whether an event for changing a configuration is detected. When it is determined that the event is detected, the process proceeds to step S304, and otherwise, stands by until the event is detected.

In step S304, the change target setting extraction module 185 extracts setting contents that need to be changed (or newly required) according to the event.

In step S306, the setting grasping module 190 issues, to another information processing apparatus 100, a request for acquiring configuration information of the other information processing apparatus 100 and a setting that the other information processing apparatus 100 possesses.

In step S308, the setting grasping module 190 receives a reply to the request.

In step S310, the setting grasping module 190 extracts the information processing apparatus 100 that possesses the setting contents extracted in step S304.

In step S312, the setting grasping module 190 determines whether a plurality of information processing apparatuses 100 are extracted in step S310. When it is determined that the plurality of information processing apparatuses 100 are extracted, the process proceeds to step S314, and otherwise, proceeds to S316.

In step S314, the setting grasping module 190 selects an information processing apparatus 100 that has the smallest difference in configuration from the own information processing apparatus 100.

In step S316, the setting grasping module 190 selects the information processing apparatus 100 extracted in step S310.

In step S318, the replication request module 165 requests for the setting of the changed configuration (the setting extracted in step S304) from the information processing apparatus 100 selected in step S314 or S316.

In step S320, the replication request module 165 receives a reply to the request made in step S318.

In step S322, the cloning process module 160 sets the setting of the configuration received in step S320, in the own information processing apparatus 100.

In addition, when plural pieces of setting information are necessary in step S304, an information processing apparatus 100 that possesses all of the necessary pieces of setting information is extracted in step S310. However, when there exists no information processing apparatus 100 that possesses all of the necessary pieces of setting information (that is, when another information processing apparatus 100 that possesses the same settings as the plural necessary settings does not exist), the setting grasping module 190 may extract, for each piece of setting information, an information processing apparatus 100 that possesses the piece of setting information (as a result, a plurality of information processing apparatuses 100 are extracted). Then, the individual pieces of setting information may be received from the information processing apparatuses 100.

A specific example of the process of the flowchart illustrated in FIG. 3 will be described with reference to FIGS. 4 to 10.

Figure 4:
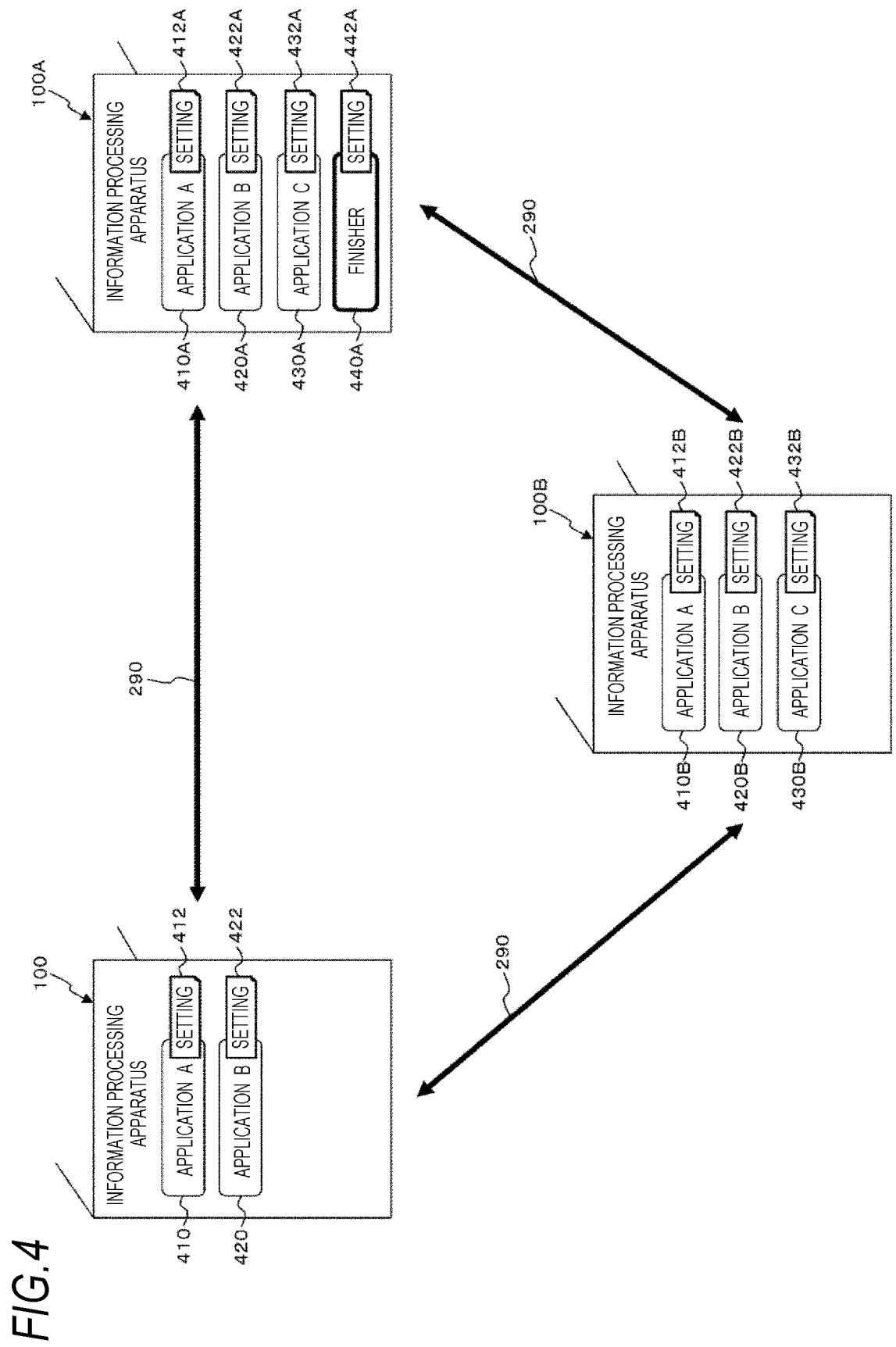
FIG. 4 is an explanatory view illustrating an example of the process according to the exemplary embodiment.

FIG. 4 is an explanatory view illustrating an example of the process according to the present exemplary embodiment.

It is premised on that with respect to two or more information processing apparatuses 100 that are able to communicate with each other, each information processing apparatus 100 requires an interface for replicating a setting of the own information processing apparatus 100 to a counterpart information processing apparatus 100.

In the example of FIG. 4, the information processing apparatuses 100, 100A, and 100B are able to communicate with each other via the communication line 290 and are in a state of being able to replicate the settings to each other.

In addition, the information processing apparatus 100 is provided with an application A 410 and an application B 420. The application A 410 has setting information 412. The application B 420 has setting information 422.

In addition, the information processing apparatus 100A is provided with an application A 410A, an application B 420A, and an application C 430A, and a finisher 440A. The application A 410A has setting information 412A. The application B 420A has setting information 422A. The application C 430A has setting information 432A. The finisher 440A has setting information 442A.

In addition, the information processing apparatus 100B is provided with an application A 410B, an application B 420B, and an application C 430B. The application A 410B has setting information 412B. The application B 420B has setting information 422B. The application C 430B has setting information 432B.

Figure 5:
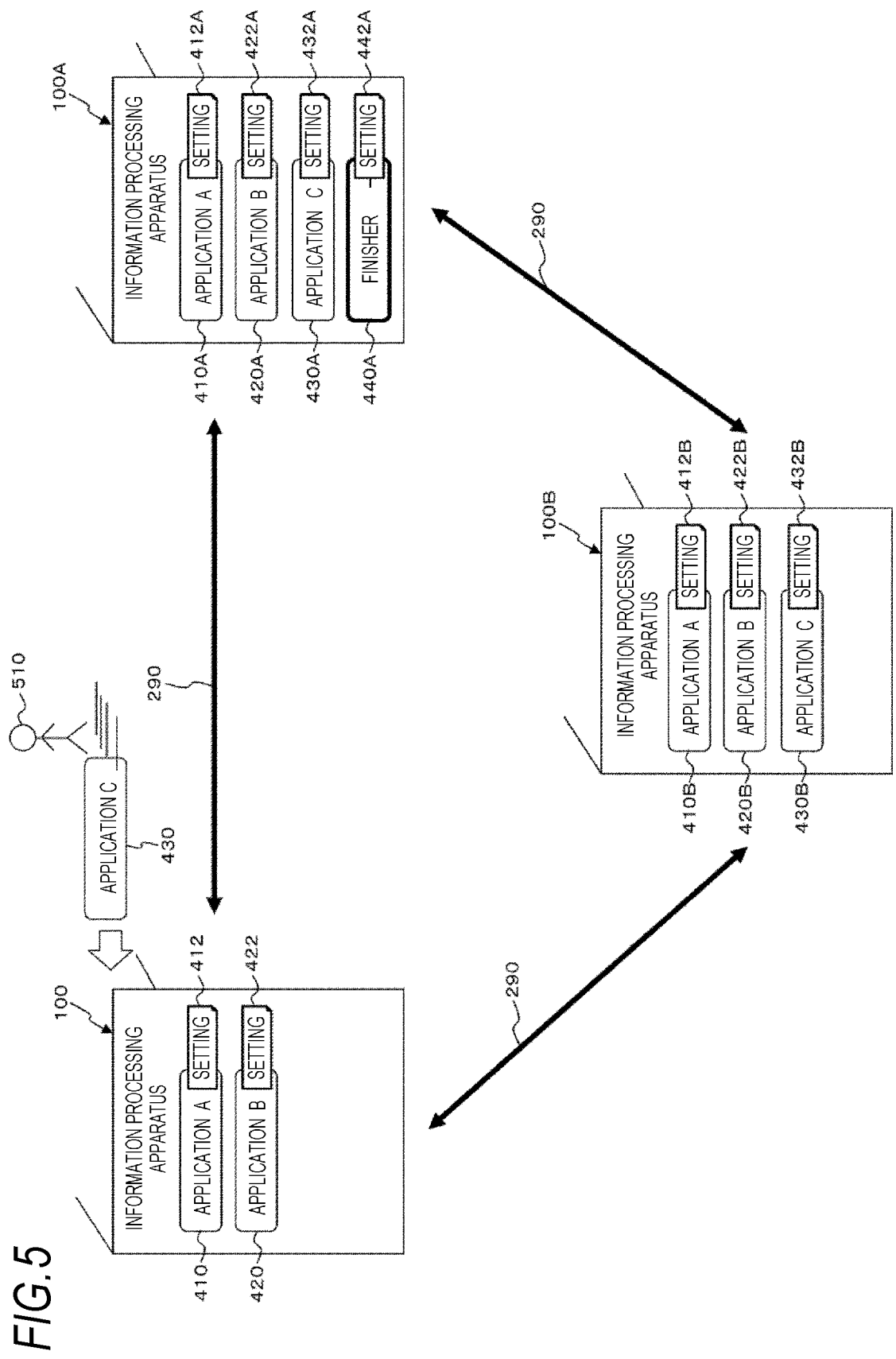
FIG. 5 is an explanatory view illustrating an example of the process according to the exemplary embodiment.

FIG. 5 is an explanatory view illustrating an example of the process according to the present exemplary embodiment.

It is assumed that a user 510 installs an application C 430 in the information processing apparatus 100 in the state illustrated in the example of FIG. 4. Accordingly, it is necessary to acquire and set setting information of the application C 430. Here, the processes of steps S302 and S304 in the flowchart illustrated in the example of FIG. 3 are performed. That is, in step S302, it is detected that the application C 430 has been installed, and the process proceeds to step S304.

In the process of step S304, the setting information that is required due to the installation of the application C 430 is extracted from, for example, a detection target event/change target setting table 600. FIG. 6 is an explanatory view illustrating an example of a data structure of the detection target event/change target setting table 600. The detection target event/change target setting table 600 has an ID column 610, a detection target event column 620, and a change target setting column 630. The ID column 610 stores ID (identification) that is information for uniquely identifying an event in the present exemplary embodiment. The detection target event column 620 stores an event that is set as a detection target. The change target setting column 630 stores setting information to be changed in a case where the event is detected.

For example, when the detection target event having an ID "1" is "AddOn application installation", a "setting of the application" is necessary as the change target setting. When the detection target event having an ID "2" is "Add-On application update", a "setting of the application" is necessary as the change target setting. When the detection target event having an ID "4" is "finisher installation", a "setting of a finisher administrator", a "setting of an application of a printing system using the finisher", and a "setting of an application of a copying system using the finisher" are necessary as the change target settings. When the detection target event having an ID "5" is "finisher uninstallation", a "setting of a finisher administrator" is necessary as the change target setting.

In the example of FIG. 5, since the application C 430 has been installed, the "setting of the application" is extracted as the change target setting from the first row (ID "1") of the detection target event/change target setting table 600.

In addition, as shown in the third row of the detection target event/change target setting table 600, when the installation of the finisher is detected, the two necessary settings of the "setting of an application of a printing system using the finisher" and the "setting of an application of a copying system using the finisher" may be extracted, in addition to the "setting of a finisher administrator".

In addition, depending on whether a detected event is present in the detection target event column 620 of the detection target event/change target setting table 600, it is checked whether the detected event is a detection target event (an event for changing a setting).

FIG. 7 is an explanatory view illustrating an example of the process according to the present exemplary embodiment.

In step S702, it is determined by the process of step S304 that setting information is necessary for the application C 430 as a requirement.

Then, among the other information processing apparatuses 100 capable of performing a communication (the information processing apparatus 100A and the information processing apparatus 100B in the example of FIG. 7), the information processing apparatus 100 that possesses the setting information required by the own information processing apparatus 100 is detected. That is, here, the process of step S306 in the flowchart illustrated in the example of FIG. 3 is performed.

In step S704A, the setting grasping module 190 issues a request for acquiring the configuration information of the information processing apparatus 100A and the setting that the information processing apparatus 100A possesses, to the information processing apparatus 100A.

In step S704B, the setting grasping module 190 issues a request for acquiring the configuration information of the information processing apparatus 100B and the setting that the information processing apparatus 100B possesses, to the information processing apparatus 100B.

As process results of steps S704A and S704B, replies are received from the information processing apparatus 100A and the information processing apparatus 100B in response to the requests. From the replies, a selection table 800 is generated. Here, the processes of steps S308 to S314 in the flowchart illustrated in the example of FIG. 3 are performed.

Figure 8:
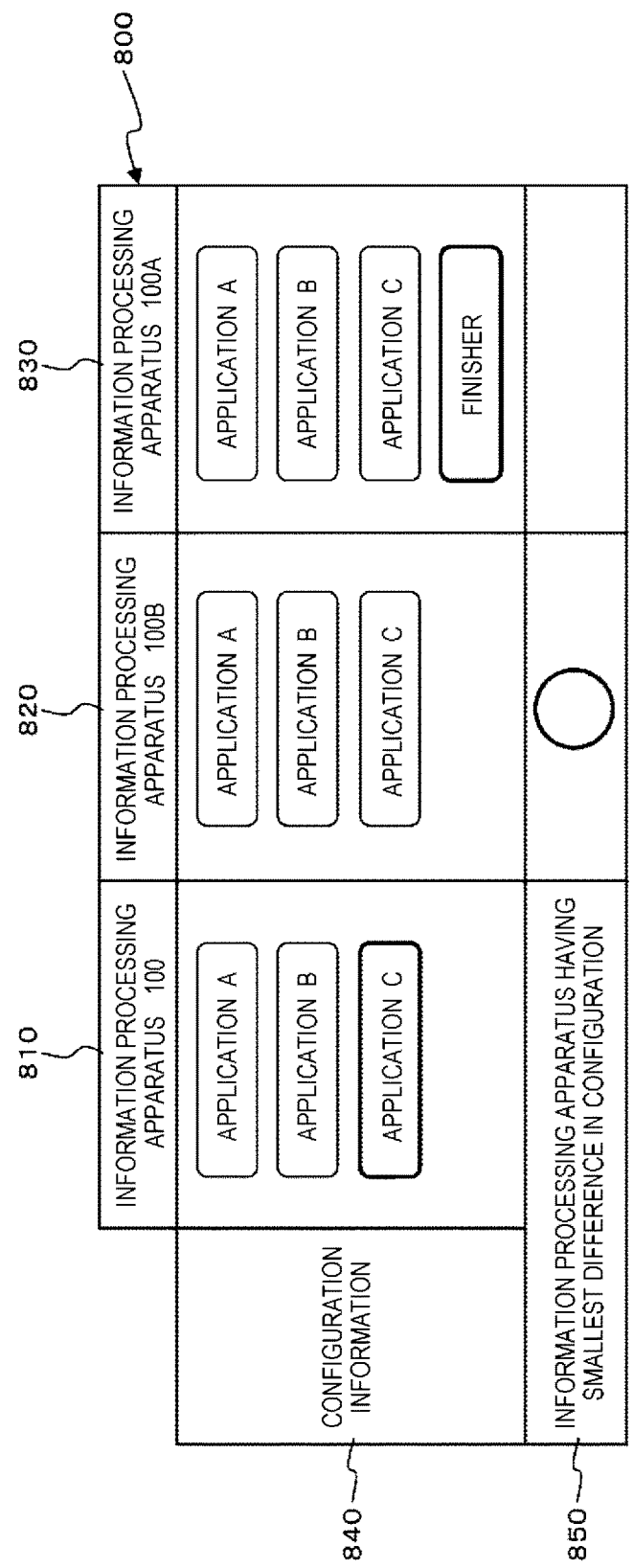
FIG. 8 is an explanatory view illustrating an example of a data structure of a selection table.

FIG. 8 is an explanatory view illustrating an example of a data structure of the selection table 800. The selection table 800 has an own information processing apparatus 100 column 810, an information processing apparatus 100B column 820, and an information processing apparatus 100A column 830 in the column direction. The selection table 800 also has a configuration information row 840 and an information processing apparatus with smallest configuration difference row 850 in the row direction. The own information processing apparatus 100 column 810 stores, for example, configuration information of the own information processing apparatus 100. The information processing apparatus 100B column 820 stores, for example, configuration information of the information processing apparatus 100B. The information processing apparatus 100A column 830 stores, for example, configuration information of the information processing apparatus 100A. The configuration information row 840 stores configuration information. The information processing apparatus with smallest configuration difference row 850 stores information as to whether the detected information processing apparatus is an information processing apparatus having the smallest difference in configuration from the own information processing apparatus 100.

As the information processing apparatus having the setting extracted in step S304 (setting information of the application C 430), there are the information processing apparatuses 100A and 100B. That is, there exist two or more other information processing apparatuses that possess the same setting as the target setting. Of the apparatuses, an information processing apparatus having the smallest difference in configuration from the own information processing apparatus 100 is selected.

In the example of FIG. 8, the information processing apparatus 100 is provided with the application A 410, the application B 420, and the application C 430, the information processing apparatus 100B is provided with the application A 410B, the application B 420B, and the application C 430B, and the information processing apparatus 100A is provided with the application A 410A, the application B 420A, and the application C 430A, and the finisher 440A.

Since the information processing apparatus 100B has the smallest difference in configuration from the information processing apparatus 100, the information processing apparatus 100B is selected.

In addition, the reason for selecting the information processing apparatus having the smallest difference in configuration is that if an information processing apparatus has a configuration difference, a value which has been affected by the configuration difference may be set to the setting which will be acquired. For example, the setting information of the application C of the information processing apparatus 100A includes an operation setting using the finisher, and this operation setting is incompatible with that of the own information processing apparatus 100. That is, this is because the application C is affected by the finisher.

Figure 9:
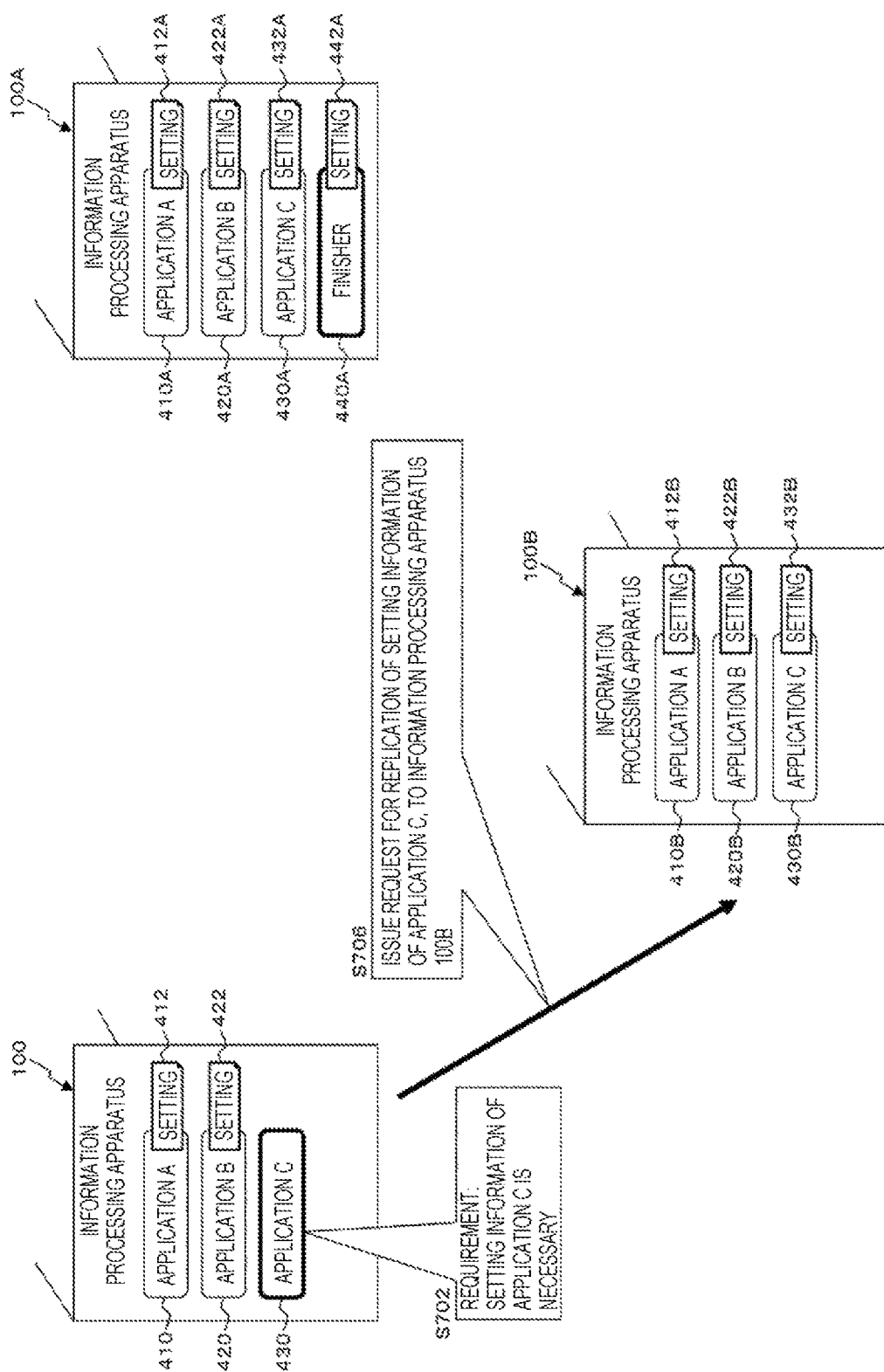
FIG. 9 is an explanatory view illustrating an example of the process according to the exemplary embodiment.

FIG. 9 is an explanatory view illustrating an example of the process according to the present exemplary embodiment. As described with reference to the example of FIG. 8, the replication request is issued to the selected information processing apparatus 100B. That is, here, the process of step S318 in the flowchart illustrated in the example of FIG. 3 is performed.

Step S702 is as described in FIG. 7.

In step S706, a request for replicating the setting information of the application C 430 is issued to the information processing apparatus 100B.

Figure 10:
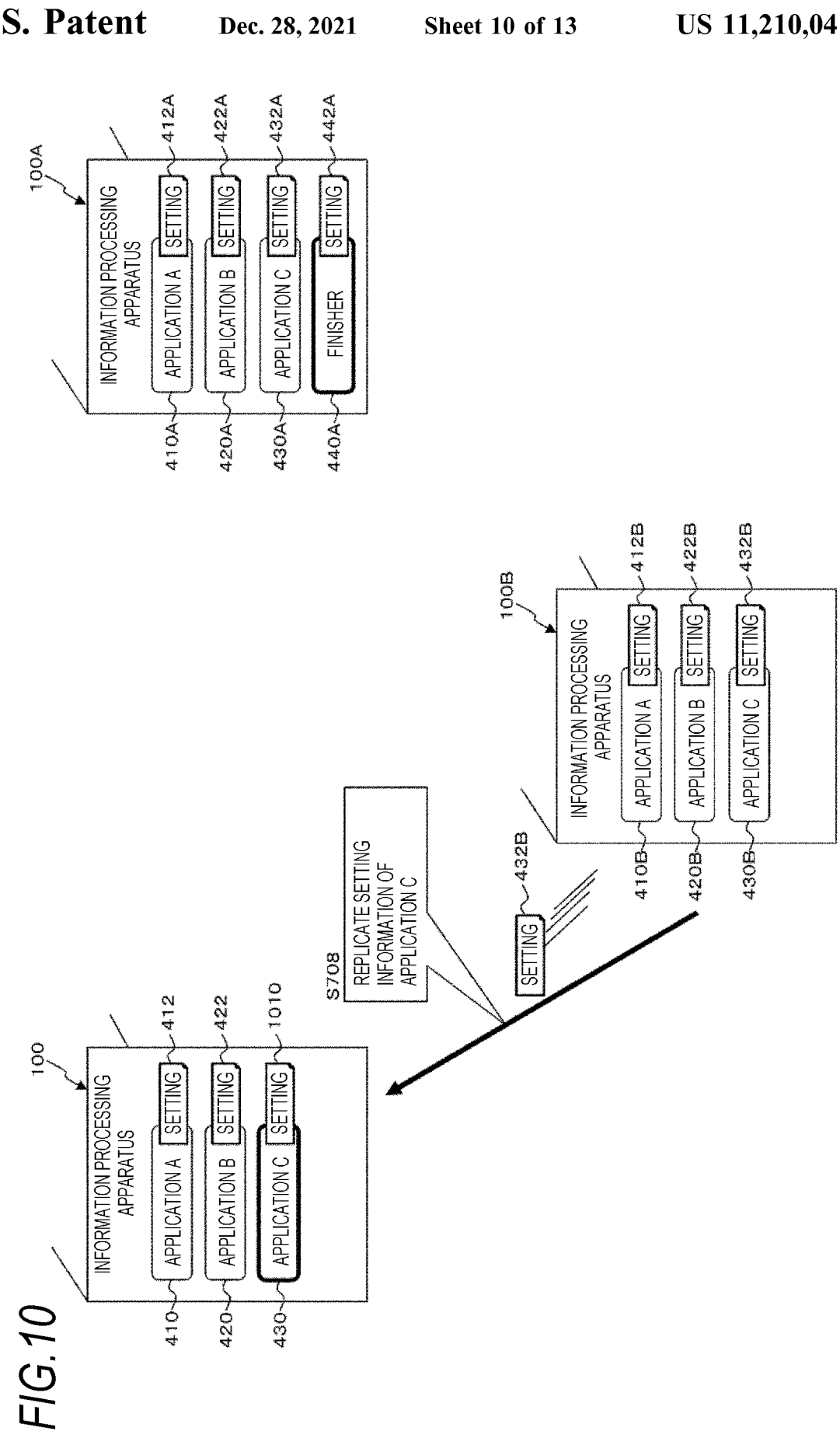
FIG. 10 is an explanatory view illustrating an example of the process according to the exemplary embodiment.

FIG. 10 is an explanatory view illustrating an example of the process according to the present exemplary embodiment.

In response to the replication request, the information processing apparatus 100B performs the replication process (transmits the setting information 432B) to the own information processing apparatus 100. That is, here, the processes of steps S320 and S322 in the flowchart illustrated in the example of FIG. 3 are performed.

In step S708, the setting information 432B which is the setting information of the application C 430B is extracted and replicated (transmitted) to the information processing apparatus 100.

Then, the information processing apparatus 100 sets the setting information 432B (setting information 1010 in FIG. 10) in the application C 430.

Figure 11:
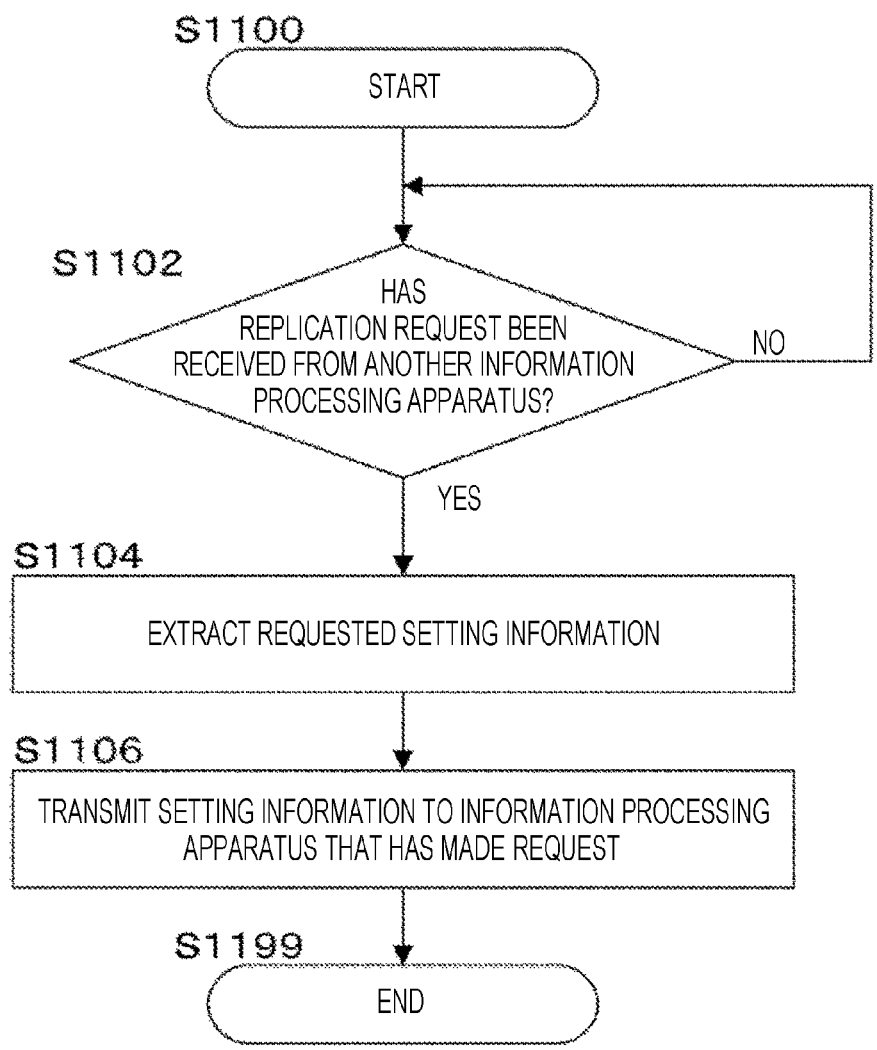
FIG. 11 is a flowchart illustrating an example of the process according to the exemplary embodiment.

FIG. 11 is a flowchart illustrating an example of the process according to the present exemplary embodiment. That is, FIG. 11 illustrates an example of a process of the information processing apparatus 100 that has received the replication request (the information processing apparatus 100B in the example described above).

In step S1102, it is determined whether the replication request has been received from another information processing apparatus 100. When it is determined that the replication request has been received, the process proceeds to step S1104, and otherwise, stands by until the replication request is received.

In step S1104, the requested setting information is extracted.

In step S1106, the setting information is transmitted to the information processing apparatus 100 that has made the request.

Figure 12:
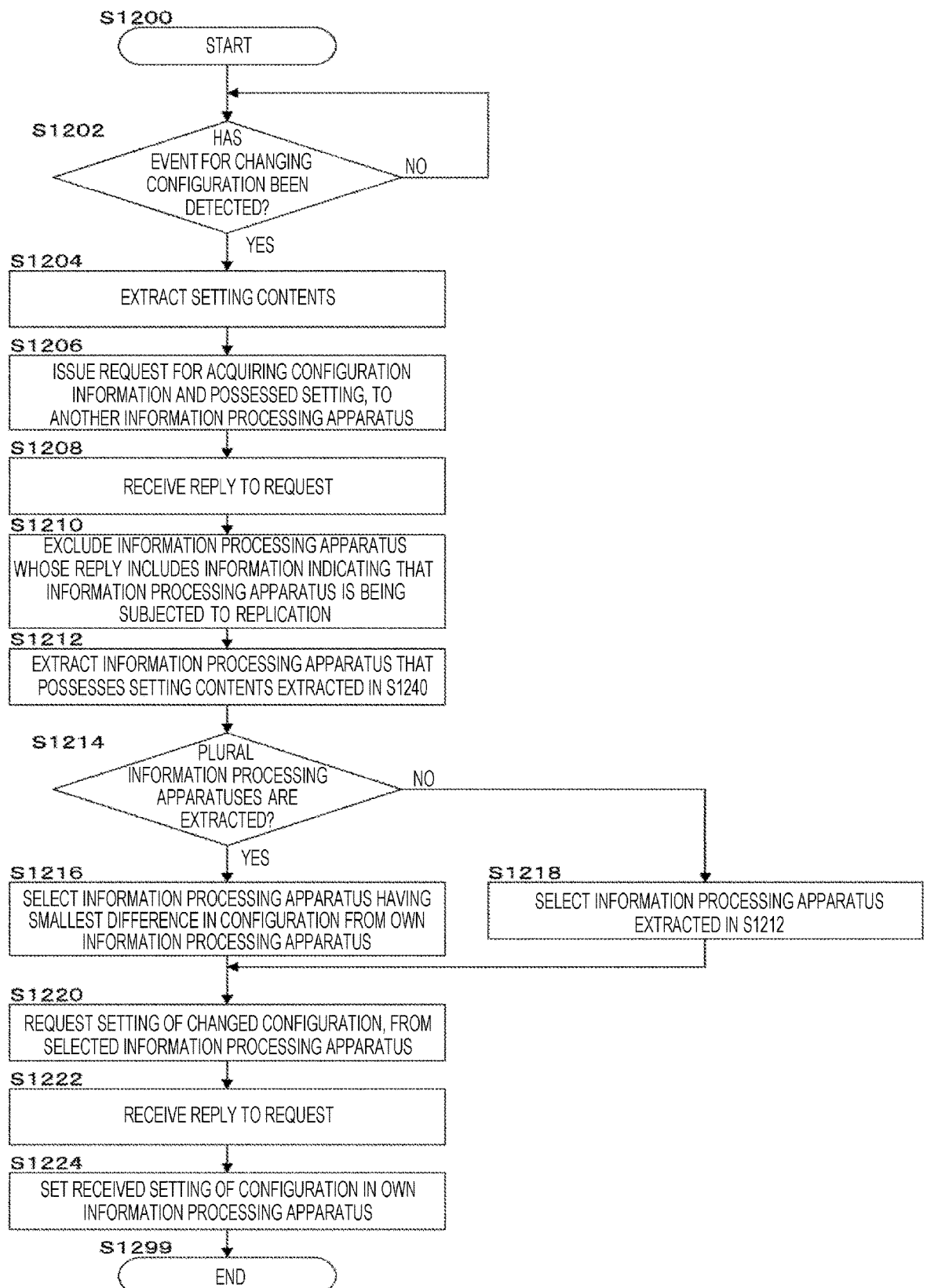
FIG. 12 is a flowchart illustrating an example of the process according to the exemplary embodiment.

FIG. 12 is a flowchart illustrating an example of the process according to the present exemplary embodiment.

In step S1202, the configuration change detection module 180 determines whether an event for changing a configuration is detected. When it is determined that the event is detected, the process proceeds to step S1204, and otherwise, stands by until the event is detected.

In step S1204, the change target setting extraction module 185 extracts setting contents that need to be changed (or newly required) due to the event.

In step S1206, the setting grasping module 190 issues, to another information processing apparatus 100, a request for acquiring configuration information of the other information processing apparatus 100 and setting that the other information processing apparatus 100 possesses.

In step S1208, the setting grasping module 190 receives a reply to the request.

In step S1210, the setting grasping module 190 excludes an information processing apparatus 100 whose reply includes information indicating that the information processing apparatus 100 is being subjected to the replication. This is because, as described above, the target setting information may be changed by the replication. In addition, the other information processing apparatus 100 that has received the request returns information indicating whether the other information processing apparatus 100 is being subjected to the replication, in response.

In step S1212, the setting grasping module 190 extracts the information processing apparatus 100 having the setting contents extracted in step S1204.

In step S1214, the setting grasping module 190 determines whether a plurality of information processing apparatuses 100 are extracted in step S1212. When it is determined that the plurality of information processing apparatuses 100 are extracted, the process proceeds to step S1216, and otherwise, proceeds to S1218.

In step S1216, the setting grasping module 190 selects the information processing apparatus 100 having the smallest difference in configuration from the own information processing apparatus 100.

In step S1218, the setting grasping module 190 selects the information processing apparatus 100 extracted in step S1212.

In step S1220, the replication request module 165 requests the setting of the changed configuration from the information processing apparatus 100 selected in step S1216 or S1218.

In step S1222, the replication request module 165 receives a reply to the request in step S1220.

In step S1224, the cloning process module 160 sets the setting of the configuration received in step S1222 in the own information processing apparatus 100.

Figure 13:
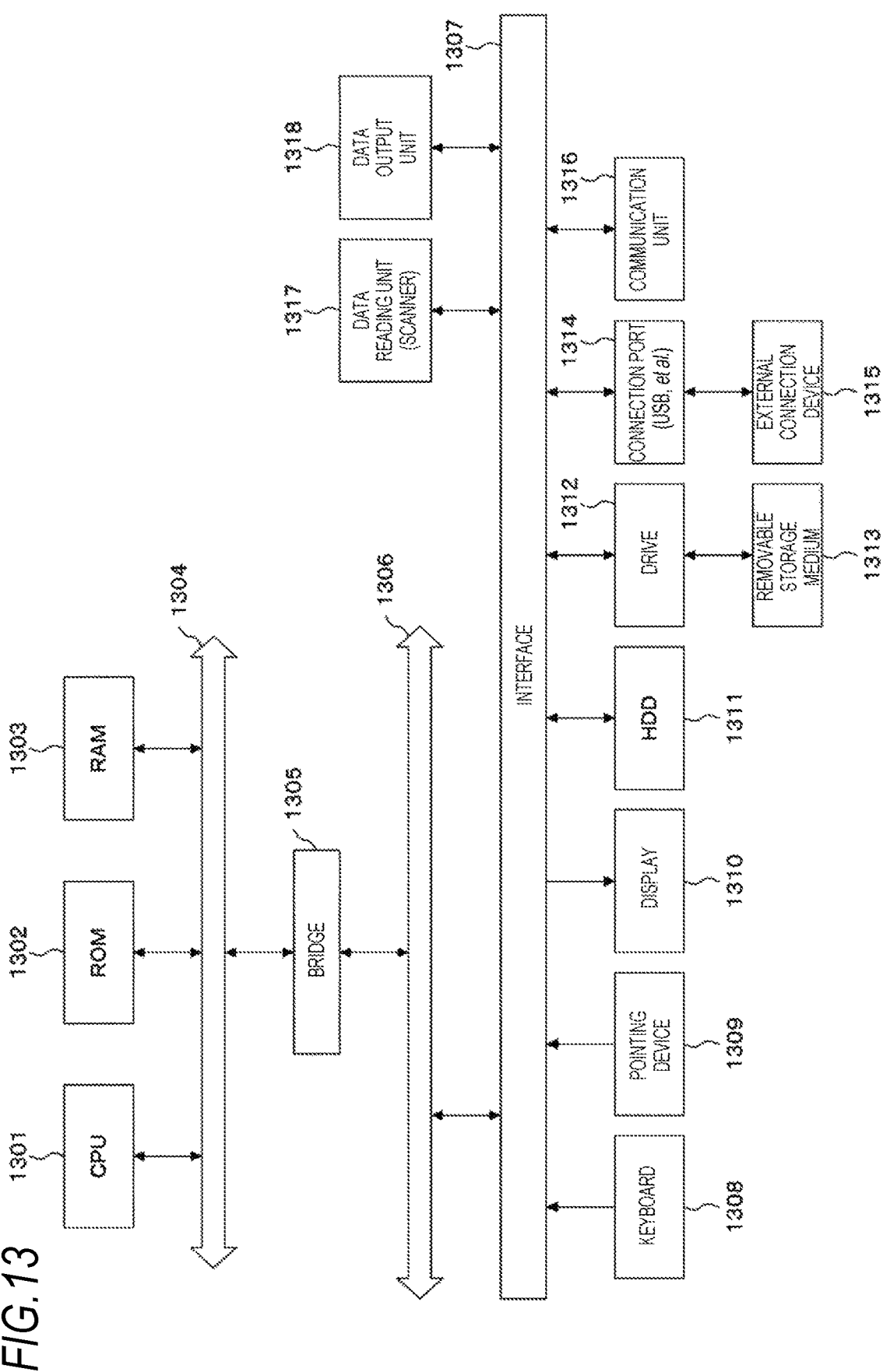
FIG. 13 is a block diagram illustrating an example of a hardware configuration of a computer for implementing the exemplary embodiment.

With reference to FIG. 13, an example of a hardware configuration of the information processing apparatus 100 of the present exemplary embodiment will be described. The configuration illustrated in FIG. 13 is implemented by, for example, a personal computer (PC). FIG. 13 illustrates an example of a hardware configuration provided with a data reading unit 1317 such as a scanner and a data output unit 1318 such as a printer.

A central processing unit (CPU) 1301 is a controller that executes processes according to a computer program describing the execution sequence of the various modules described in the exemplary embodiment above, that is, for example, the application management module 105, the application A 110, the UI/operation module 115, the application control module 120, the operation setting module 125, the application X 130, the operation setting module 135, the finisher management module 140, the operation setting module 145, the IC card reader management module 150, the operation setting module 155, the cloning process module 160, the replication request module 165, the replication process module 170, the configuration change process module 175, the configuration change detection module 180, the change target setting extraction module 185, and the setting grasping module 190.

A ROM (read only memory) 1302 stores, for example, programs or operation parameters used by the CPU 1301. A RAM (random access memory) 1303 stores, for example, programs used in the execution by the CPU 1301 or parameters appropriately varying in the execution. These components are connected to each other by a host bus 1304 configured with, for example, a CPU bus.

The host bus 1304 is connected to an external bus 1306 such as a peripheral component interconnect/interface (PCI) bus via a bridge 1305.

A keyboard 1308 and a pointing device 1309 such as a mouse are devices operated by an operator. A display 1310 is, for example, a liquid crystal display device or a cathode ray tube (CRT), and displays various types of information as texts or image information. In addition, for example, a touch screen having the functions of both the pointing device 1309 and the display 1310 may be used. In that case, the function of the keyboard may be implemented by drawing the keyboard using software (also called, for example, a so-called software keyboard, screen keyboard) on the screen (the touch screen), without the physical connection as in the keyboard 1308.

A hard disk drive (HDD) 1311 is equipped with a hard disk (which may be, for example, a flash memory) therein, and drives the hard disk so as to cause the hard disk to store or play programs or information executed by the CPU 1301. The hard disk stores, for example, application programs and setting information. Further, the hard disk stores, for example, other various data and various computer programs.

A drive 1312 reads data or programs stored in a removable storage medium 1313 such as a mounted magnetic disc, optical disc, magneto-optical disc, or semiconductor memory, and supplies the data or programs to an interface 1307, the external bus 1306, the bridge 1305, and the RAM 1303 connected via the host bus 1304. In addition, the removable storage medium 1313 may also be used as a data storage area.

A connection port 1314 is a port for a connection of an external connection device 1315, and has a connection portion for, for example, a USB or IEEE1394. The connection port 1314 is connected to, for example, the CPU 1301 via, for example, the interface 1307, the external bus 1306, the bridge 1305, and the host bus 1304. A communication unit 1316 is connected to a communication line and performs a process of a data communication with an external device. A data reading unit 1317 is, for example, a scanner and performs a process of reading a document. The data output unit 1318 is, for example, a printer and performs a process of outputting document data.

In addition, the hardware configuration of the information processing apparatus 100 illustrated in FIG. 13 merely represents an example of a configuration. The present exemplary embodiment is not limited to the configuration illustrated in FIG. 13, and may be any configuration that can execute the modules described in the present exemplary embodiment. For example, some of the modules may be configured with dedicated hardware (e.g., application specific integrated circuit (ASIC)), and some of the modules may be in the form in which the modules are present in an external system and connected via a communication line. In addition, the plurality of systems illustrated in FIG. 13 may be connected to each other via a communication line and operated in cooperation with each other. Especially, the hardware configuration of the present exemplary embodiment may be equipped in, for example, a mobile information communication device (including, for example, a mobile phone, a smartphone, a mobile device, and a wearable computer), information home appliance, a robot, a copy machine, a facsimile, a scanner, a printer, or a multifunction machine (an information processing apparatus having any two or more functions of a scanner, a printer, a copy machine, and a facsimile), in addition to a personal computer.

In addition, the programs described above may be provided in a state of being stored in a storage medium, or may be provided by a communication unit. In that case, for example, the programs described above may be construed as an invention of a "computer readable storage medium storing a program".

The "computer readable storage medium storing a program" refers to a computer readable storage medium storing a program, which is used for, for example, installation, execution, and distribution of a program.

In addition, examples of the storage medium include a digital versatile disk (DVD) such as "DVD-R, DVD-RW, or DVD-RAM" which is the standard formulated in the DVD forum, "DVD+R or DVD+RW" which is the standard formulated in DVD+RW, a compact disc (CD) such as a CD read only memory (CD-ROM), a CD recordable (CD-R), or a CD rewritable (CD-RW), a Blue ray disc (Blu-ray (registered trademark) disk), a magneto-optical (MO) disc, a flexible disc (FD), a magnetic tape, a hard disk, a ROM, an electrically erasable and rewritable read only memory (EE-PROM (registered trademark)), a flash memory, a random access memory (RAM), and a secure digital (SD) memory card.

All or some of the programs described above may be stored in the storage medium above and thus may be, for example, saved or distributed. In addition, the programs may be transmitted using a transmission medium such as a wired network used in, for example, a local area network (LAN), a metropolitan area network (MAN), a wide area network (WAN), the Internet, the Intranet, and the Extranet, a wireless communication network, or a combination thereof, or may be carried on carrier waves.

In addition, the programs described above may be all or parts of other programs, or may be stored together with another program in the storage medium. In addition, the programs may be distributed and stored in a plurality of storing media. In addition, the programs may be stored in a compressed or encrypted form as long as the programs may be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    an extraction unit configured to, when an event for changing a configuration of the information processing apparatus occurs, extract a setting that needs to be changed; and
    a request unit configured to select another information processing apparatus of a plurality of other information processing apparatus, the selected another information processing apparatus having the setting extracted by the extraction unit and having a smallest difference in configuration, of the plurality of another information processing apparatus, from the information processing apparatus, and to request the another information processing apparatus to replicate the setting to the information processing apparatus.

2. The information processing apparatus according to claim 1, further comprising:
    a replication unit configured to, when a replication request is received from a request unit of the another information processing apparatus, replicate a setting to the other information processing apparatus according to the request.

3. The information processing apparatus according to claim 2, further comprising:
    a notification unit configured to, when there exists a setting that is inappropriate for the replication, notify a user of the setting.

4. The information processing apparatus according to claim 1, wherein the event includes
    installation or uninstallation of a hardware option or an extension unit of the information processing apparatus,
    a setup or a change of firmware or an application,
    a change of a setting on an authority of an administrator, or
    a change of a setting for each user.

5. The information processing apparatus according to claim 4, wherein the setting that needs to be changed when the event is detected includes
    an operation setting of the installed or uninstalled hardware option or extension unit,
    an operation setting of the set-up or changed firmware or application,
    the change of the setting on the authority of the administrator, or
    the change of the setting for each user.

6. The information processing apparatus according to claim 5, wherein the setting that needs to be changed includes a setting that needs to be changed in relation to the setting that is changed.

7. The information processing apparatus according to claim 1, wherein the extraction unit is configured to extract a plurality of settings that need to be changed, and when another information processing apparatus that possesses the same settings as the plurality of the settings extracted by the extraction unit does not exist, the request unit selects a plurality of other information processing apparatuses each of which possess at least any of the plurality of extracted settings.

8. The information processing apparatus according to claim 1, wherein when the other information processing apparatus has been subjected to the replication, the request unit does not make the replication request to the other information processing apparatus.

9. The information processing apparatus according to claim 1, wherein when the request unit cannot make the request, a notification is performed to a user in order to prompt an existing replication process or a manual replication process.

10. The information processing apparatus according to claim 9, wherein a case where the request cannot be made is a case where another information processing apparatus that possesses a target setting does not exist.

11. An information processing system comprising:
    a first information processing apparatus; and
    a second information processing apparatus connected to the first information processing apparatus via a communication line, wherein
    the first information processing apparatus includes
        an extraction unit configured to, when an event for changing a configuration of the first information processing apparatus occurs, extract a setting that needs to be changed, and
        a request unit configured to select the second information processing apparatus, the second information processing apparatus having the setting extracted by the extraction unit, the second information processing apparatus being one of a plurality of other information processing apparatuses and having a smallest difference in configuration, of the plurality of other information processing apparatuses, from the first information processing apparatus, and to request the second information processing apparatus to replicate the setting to the first information processing apparatus, and
    the second information processing apparatus includes a replication unit configured to, when the replication request is received from the request unit of the first information processing apparatus, replicate the setting to the first information processing apparatus according to the request.

12. A non-transitory computer readable medium storing a program that causes a computer which is an information processing apparatus to execute information processing, the information processing comprising:
    when an event for changing a configuration of the information processing apparatus occurs, extracting a setting that needs to be changed; and
    selecting another information processing apparatus of a plurality of another information processing apparatuses, the selected another information processing apparatus having the extracted setting and having a smallest difference in configuration, of the plurality of other information processing apparatuses, from the information processing apparatus, and to request the another information processing apparatus, to replicate the setting to the information processing apparatus.

* * * * *